Jan. 29, 1963   R. F. REIFERS   3,075,872
PROCESS AND APPARATUS FOR MOLDING PULP ARTICLES
Filed June 23, 1960   2 Sheets-Sheet 2

INVENTOR
Richard F. Reifers

BY *Karl W. Flocks*
ATTORNEY

United States Patent Office 3,075,8[...]
Patented Jan. 29, 19[...]

3,075,872
PROCESS AND APPARATUS FOR MOLDING PULP ARTICLES
Richard F. Reifers, New Canaan, Conn., assignor to Diamond National Corporation, New York, N.Y., a corporation of Delaware
Filed June 23, 1960, Ser. No. 38,354
10 Claims. (Cl. 162—223)

This invention relates to apparatus and a process of molding pulp articles, and more particularly to apparatus and a process of after forming a molded pulp article.

In the manufacture of molded pulp articles, such as food containers, it has been previously proposed to after form such articles to obtain reinforcements and particularly configurations. However, no suitable process has been proposed for molding or after forming molded pulp articles to provide side walls thereof with an inward or negative slope or any other type of negative draft. Such articles cannot be molded directly with reverse angles or negative drafts due to the difficulty of removing the article from the forming die having such negative draft. Of course, collapsible forming dies could be utilized, however, they are not practical for use in normal commercial production due to their complex constructions.

Accordingly, it is an object of the present invention to provide an improved apparatus and process of molding and after forming molded pulp articles.

A further object of the present invention is to provide an improved apparatus and process of molding and after forming to produce a molded pulp article having side walls with an inward slope.

A still further object of the present invention is to provide an improved apparatus and process of producing a molded pulp article having a negative draft in the side walls thereof.

A still further object of the present invention is to provide an improved method of after forming which is called "memory after forming."

A further object of the present invention is to provide a molded pulp article with improved denesting properties.

Other objects and the nature and advantages of the instant invention will be apparent from the following description taken in conjunction with the accompanying drawings wherein.

Figure 1:
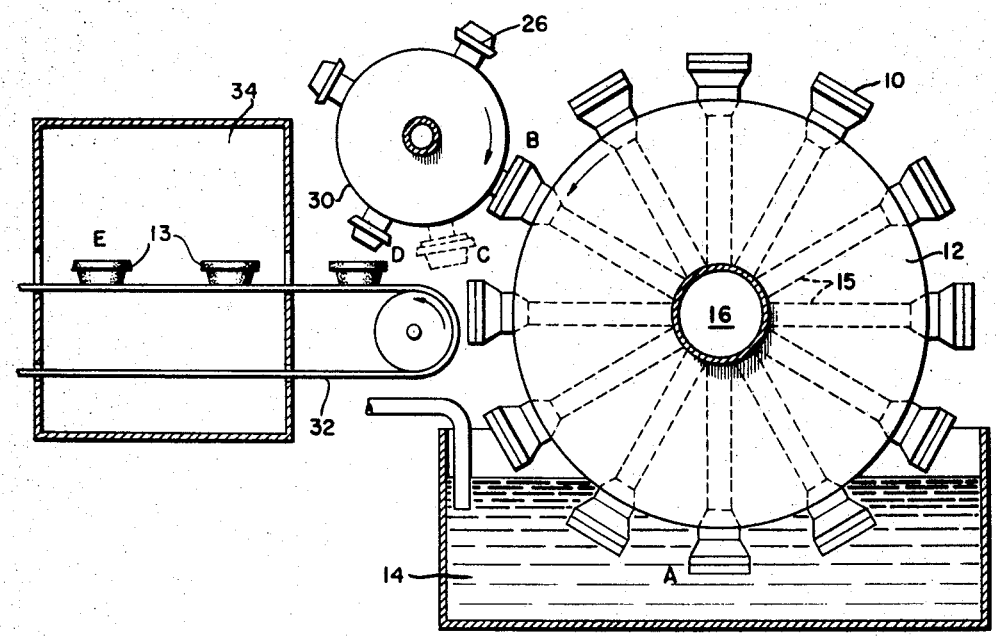
FIG. 1 is a side elevational view of pulp molding apparatus embodying the invention.
Figure 2:
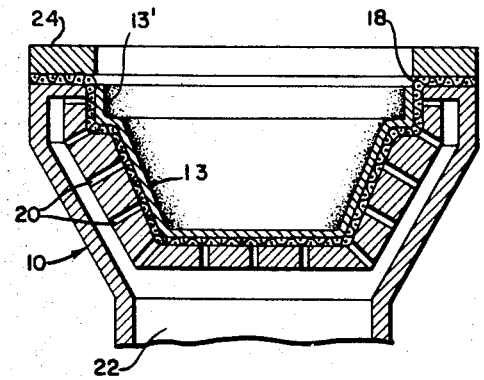
FIG. 2 is a vertical sectional view of a mold with the article molded therein.

Referring to FIG. 1, a plurality of foraminous molds 10 are located at equal intervals circumferentially spaced on the periphery of a cylindrical drum 12 mounted horizontally for rotation on its axis above a slurry tank 14. Each of the molds 10 is connected by one of a plurality of radial channels 15 to a central hollow shaft 16 extending axially through the drum 12 and communicating with an exterior source of suction (not shown). Driving means (not shown) operatively connected to the shaft 16 is provided for rotating the drum 12 either continuously or intermittently. During rotation of the drum 12, the molds 10 are advanced successively through liquid pulp slurry contained in the tank 14 while suction is applied to molds 10 through the channels 15. The suction appl[ied] during the immersion of the molds 10 causes pulp fib[er] to be extracted from the slurry and deposited onto molds, thereby forming initially molded pulp articles as shown in FIG. 2. In the usual manner, the suctio[n] continued while the molds 10 are advanced upwar[d] above the slurry to extract excess moisture from the [p]forms until the molds reach a transfer position indica[ted] generally at B, where the suction on the successive mo[ld] is shut off momentarily while the mechanism 30 remo[ves] the initially formed articles.

It should be noted that the articles molded in molds 10, at A in FIG. 1 and as shown in more de[tail] in FIG. 2 are containers 13 which have an upper s[ide] wall portion 13' which is shown to be substantially ve[rti]cal for ease in removal from the molds 10. The mo[lds] 10 are each provided with a wire mesh covering 18 o[ver] the surface of the mold. Each mold has perforations therethrough and a chamber 22 behind these perforati[ons] which is connected to one of the radial channels 15. T[he] wire mesh covering 18 is held in place by a retain[ing] ring 24.

The transfer mechanism includes a plurality of d[ies] 26 contoured to fit against the successive molds 10 [to] remove the pulp preforms 13 therefrom as shown a[t B] in FIG. 1. The dies 26, as shown in FIGS. 3 and 4 [are] shaped to conform to the lower portion of the pulp p[re]form 13; however, the upper side walls 28 have an [in]ward or negative slope which corresponds to the desi[red] final shape of the container.

The dies 26 are mounted radially on a rotatable carr[ier] 30 positioned adjacent to the drum 12 and directly o[ver] one end of a conveyor belt 32, which transports the p[ulp] articles to a drying oven 34. Suction may be appl[ied] intermittently with air pressure to the dies 26 to ena[ble] them to remove the pulp articles 13 from the success[ive] molds 10 as at B in FIG. 1 and then blow them off the dies 26 shown at D in FIG. 1 onto the conveyor [belt] 32. The carrier 30 is rotatable in synchronization w[ith] the drum 12 and at a greater speed than the drum 12 [so] that the dies 26 may be mounted at only four eq[ual] intervals on the carrier 30 and yet cooperate with [the] molds 10, which are shown to be mounted at more th[an] four equal intervals on the periphery of the drum 12[.]

The molds 10 are shown located at twelve equal in[ter]vals on the periphery of the drum 12 but it is evident t[hat] the number of intervals may be varied from fewer [to] many more than twelve depending upon the size of [the] drum and the size and spacing of the molds. At each [of] these intervals a plurality of the molds 10 may [be] mounted in a row. It is also evident that instead of [em]ploying the drum 12, a wheel or any other suitable t[ype] of carrier may be employed to advance the molds 10 s[uc]cessively through the tank 14.

Figure 3:
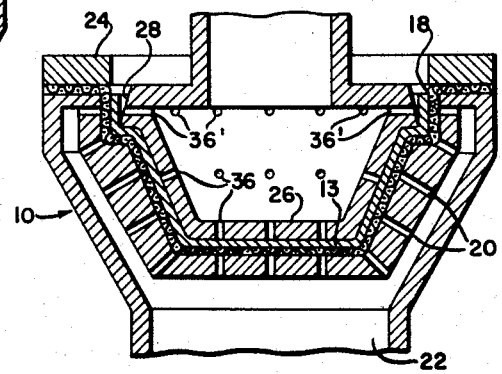
FIG. 3 is a similar view showing the transfer head entering the mold.
Figure 4:
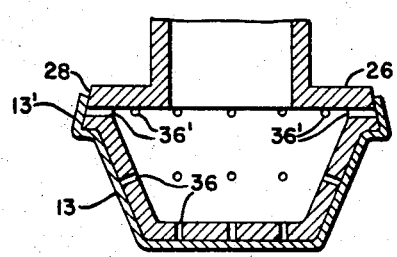
FIG. 4 is a similar view showing the article after transfer to the transfer head.

When the transfer die 26 first contacts the mold [as a] die as shown at B in FIG. 1 and more particularly [in] FIG. 3, suction is applied to the die 26 while suctio[n is] cut off of the mold 10 so that the preform 13 is tra[ns]ferred immediately onto the die 26. The die 26 ha[s a] plurality of perforations 36 therethrough leading t[o a] source of suction. A plurality of the perforations 36' [are] located in the upper inwardly sloping side walls 28 [of] the die 26 so that as the article 13 is transferred to [the] transfer die 26, the upper vertical side walls 13' of [the] preform are pulled inwardly around its periphery and l[ie] against the inwardly sloping side wall 28 of the die because of the suction therethrough. This stage of operation is shown in FIG. 4 and at C in FIG. 1.

Figure 5:
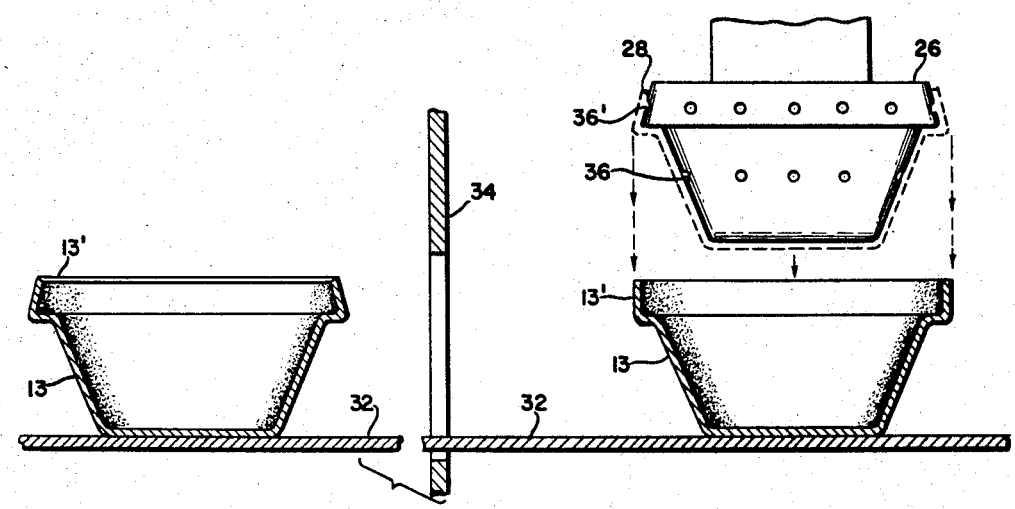
FIG. 5 is an enlarged side elevational view showing the articles after they have been transferred onto the drying belt.

When the die 26 with the preform 13 thereon [ap]proaches the conveyor belt 32, air pressure is appl[ied] through the perforations 36 of the die 26 thereby blo[wing]

ing the article from the face of the die 26 onto the conveyor belt 32 as shown at D in FIG. 1. Since the upper side walls 13' of the article were locked against the inwardly sloping surface 28 of the die 26, the upper side walls 13' must be dragged over the lower projecting portion of the side walls 28 of the die 26 as it is removed therefrom. As shown in FIG. 5 at the right, at this point the wet product has its upper side wall returned momentarily to a vertical position. However, during the drying process, as shown to the left of FIG. 5 and at E in FIG. 1, the upper side wall of the article returns to the inwardly sloping position it had assumed on the die 26.

During the drying process the fibers in the upper side wall of the article shrink back to their original inwardly sloping position through the memory of being in that position, thereby yielding an article having the inwardly sloping upper side walls. This method of after forming to yield a different configuration than its originally molded form is termed "memory after forming."

The operation of the process is as follows. The article is first molded in the mold 10 in a conventional manner (A). The preform is transferred to a transfer die 26 having the desired inward sloping surfaces (B), and suction is applied to lock the wet preform to the configuration of the transfer die (C). The article is then blown from the transfer die 26 onto the conveyor belt 32 with the article temporarily returning to its original shape since during its removal from the die it is dragged over the extending projections of the die (D). During the drying process, the article returns to the shape it had assumed on the die through the memory of being in that position (E).

Figure 7:
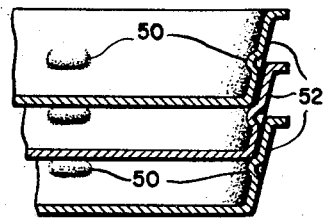
FIG. 7 is a fragmentary cross-sectional view showing a modified form of the invention.

Other uses of this process are contemplated for molding and after forming other shapes and articles than the particular one illustrated and described herein. This process can be utilized in any area of the product where negative draft is required. For example, in place of the inward slope of the side walls, a plurality of indented lug shapes 50 could be molded into the product side walls 52 to provide denesting levels below the top periphery, as shown in FIG. 7. When the term "negative draft" is used in the specification and claims, it is meant to include any inwardly extending portion of the article which renders the article incapable of being molded directly in a one-part mold because of the non-feasibility of removing the article from such a mold without disfiguring the portion having the negative draft.

Figure 6:
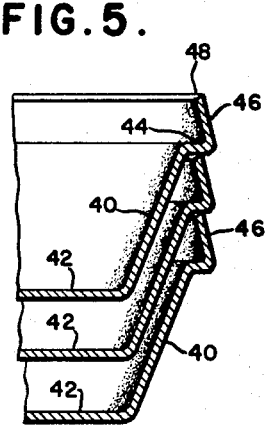
FIG. 6 is a fragmentary cross-sectional view showing containers in nested position.

The process is particularly applicable, however, to molding pulp containers which are relatively deep and which have relatively high side walls, which may be readily nested and denested as shown in FIG. 6. Such containers have four side walls 40 which extend upwardly in a slightly outwardly inclined direction from a straight bottom wall 42. Each of the side walls 40 terminates at its upper end in a substantially horizontally outwardly extending shoulder 44. An upwardly extending upper side wall portion 46 extends upwardly from each shoulder 44. Heretofore such upper side walls have either sloped outwardly or extended vertically. According to this invention the upper side walls 46 extend upwardly and inwardly at an angle to the vertical. When two or more of the containers are nested as shown in FIG. 6, the upper edge 48 of the container below engages the shoulder 44 of the container above, while the corresponding side walls 40 of the nested containers are slightly spaced apart. The spacing of the side walls prevents any frictional engagement between them, whereas the contact between the upper edge and the shoulder is merely a support contact where the only force exerted is the force of gravity. There is therefore, no locking frictional engagement whatsoever between the nested containers.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for producing a molded pulp article having side walls and having a negative draft in the side walls thereof which comprises a foraminous mold having a configuration without said negative draft in the side walls thereof, and a transfer die adapted to remove a preform from said mold, said transfer die having said negative draft in the side walls thereof conforming to the configuration of the desired finished article, and perforations through said die for applying suction whereby said preform may be simultaneously removed from said mold and after formed through the action of the suction to conform to the shape of said die.

2. Apparatus in accordance with claim 1 wherein the article to be molded and the transfer die have an inwardly extending portion in the side walls thereof with respect to the central longitudinal axis.

3. Apparatus in accordance with claim 1 wherein the article to be molded and the transfer die have a plurality of inwardly indented lug shapes therein.

4. Apparatus for producing a molded pulp article having a central longitudinal axis with an upper side wall having a negative draft therein with respect to its central longitudinal axis which comprises a foraminous mold having an upper side wall which is parallel to said central longitudinal axis and a transfer die adapted to remove a preform from said mold, such transfer die having a configuration similar to said mold except for an upper side wall having an inwardly extending angle with respect to said central longitudinal axis, and perforations through said upper side wall of said transfer die for applying suction whereby said preform may be simultaneously removed from said mold and after formed through the action of the suction to conform to the shape of said die.

5. Apparatus in accordance with claim 4 including means for removing said article from said die and a drier into which the article is conveyed immediately after it is removed from said die.

6. The method of producing a molded pulp article with a side wall having a negative draft therein with respect to the vertical, which comprises molding on a foraminous mold a preform of pulp from a liquid pulp mixture, said preform having no negative draft therein, removing the preform from the mold onto a die having the configuration of the desired finished product with a negative draft in the side wall with respect to the vertical, applying suction through the die to cause the side wall of the preform to assume the configuration of said die, blowing the article from the die and drying the article whereby the side wall of the resulting dried article reassumes the negative draft of the die.

7. The method of claim 6 wherein the negative draft in the side wall comprises negative indented lug shapes to provide denesting levels below the top periphery.

8. The method of producing a non-planar molded pulp article having at least a portion thereof inclined negatively from another portion so as to have negative draft which would normally be considered as being incapable of being molded in a one-part mold because of the non-feasibility of removing the article from such a mold without disfiguring the portion having the negative draft, said method including the conventional steps of suction molding from a pulp slurry onto a one-part foraminous mold and thereafter removing the wet preformed article from the suction mold and drying the same, said method being characterized by initially forming the wet preform in the area which is subsequently to have a negative draft without said negative draft, removing the preformed article from the initial suction mold and positively reforming the preformed article while it is still wet so as to have at least a portion thereof with negative draft by utilizing a reforming die from which the reformed article cannot be removed without at least temporarily eliminating the negative draft, and thereafter drying the article to cause the negative draft to reform itself in the finished dried article.

9. The method as set forth in claim 8, wherein the initial reforming of the wet preform is accomplished by suction.

10. The method in accordance with claim 9, wherein the removal of the wet preform from the reforming die is accomplished by positive fluid pressure.

References Cited in the file of this patent

UNITED STATES PATENTS

| | | |
|---|---|---|
| 2,515,113 | Chaplin | July 11, 19 |
| 2,619,012 | Brennan | Nov. 25, 19 |
| 2,814,427 | Emery | Nov. 26, 19 |
| 2,865,547 | Van Dyke | Dec. 23, 19 |
| 2,996,118 | Chaplin | Aug. 15, 19 |